July 13, 1926.
M. B. KAELIN
SUGAR DISPENSER
Filed March 20, 1925
1,592,491
FIG_1_
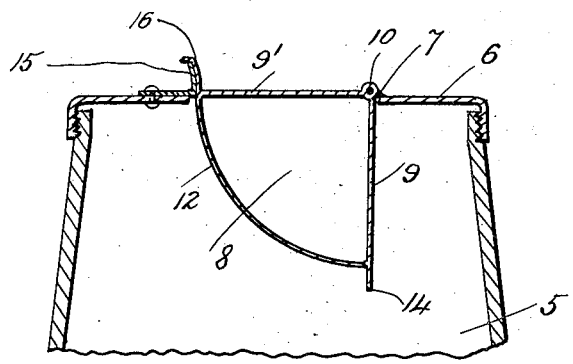
FIG_2_
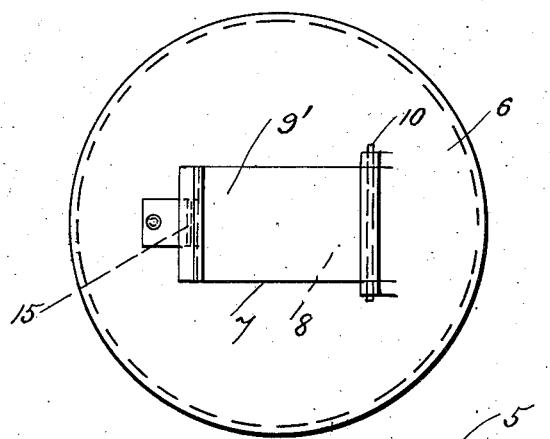
FIG_3_
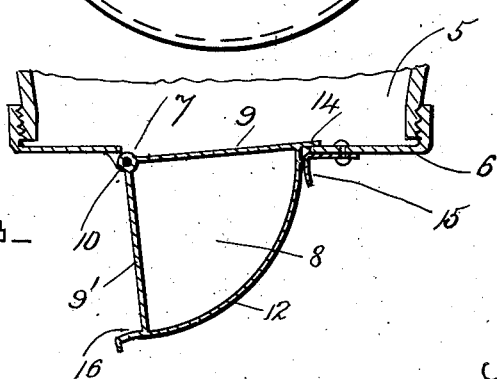
Inventor,
Meinrad B. Kaelin,
by Herbert W. P. Jenner,
Attorney.

Patented July 13, 1926.

1,592,491

UNITED STATES PATENT OFFICE.

MEINRAD B. KAELIN, OF DOVER, NEW JERSEY.

SUGAR DISPENSER.

Application filed March 20, 1925. Serial No. 16,991.

This invention relates to receptacles for sugar and other similar powdered material; and it consists of a measuring device, for dispensing the sugar, constructed as hereinafter fully described and claimed.

In the drawings, Figure 1 is a vertical section through the upper part of a dispensing vessel provided with a measuring device according to this invention. Fig. 2 is a plan view of the same. Fig. 3 is a section similar to Fig. 1, but shows the measuring device open.

The receptacle 5 for the sugar is of any approved form and material, and it is provided with a cap 6 at its top which is screwed on it, or otherwise attached to it, so that it can be removed to fill the receptacle with sugar. The cap 6 has an oblong slot 7 in its top, and 8 is a sector-shaped measuring device which works in the slot 7. This measuring device 8 has radial sides which are hinged to the cap by a pin 10 at their point of junction. The curved outer part 12 is arranged concentric with the pin 10, and the device is open at each side.

One side 9 has a radial extension or stop lug 14 which comes against the underside of the cap when the device 8 projects fully from the slot. A flat spring 15 is secured to the upper side of the cap adjacent to the curved part 12, and prevents the measuring device from opening prematurely. The other side 9' is provided with a lug 16 which engages with the spring 15 when the measuring device is fully inside the cap, and this lug also operates to limit the inward movement of the measuring device.

When the receptacle is tilted the sugar runs into the said measuring device, and when the receptacle is inverted, as shown in Fig. 3, the measuring device slides pivotally through the slot, and delivers the charge of sugar previously run into it.

What I claim is:

1. The combination, with a receptacle provided with a cap having a rectangular slot, of a sector-shaped measuring device open at each end and pivoted at its angle to the cap at one end of the slot with its peripheral portion working in the slot adjacent to the other end thereof and provided with means for limiting its pivotal movement in each direction.

2. The combination, with a receptacle provided with a cap having a rectangular slot, of a sector-shaped measuring device open at each end and pivoted to the cap at one end of the slot and working in the said slot, one side portion of the said measuring device outside the cap being provided with a projecting lug, and a spring secured to the cap and engaging with the said lug and operating to prevent the premature movement of the device.

In testimony whereof I have affixed my signature.

MEINRAD B. KAELIN.